(12) United States Patent
Cortes et al.

(10) Patent No.: US 6,976,361 B1
(45) Date of Patent: Dec. 20, 2005

(54) VENTILATION CHANNELS IN AN AFTERBURNER CHAMBER CONFLUENCE SHEET

(75) Inventors: Thierry Cortes, Brunoy (FR); Alain Page, Montgeron (FR); Sébastien Baboeuf, Avon (FR); Jacques Roche, Lisses (FR)

(73) Assignee: Snecma Moteurs, Paris (JP)

( * ) Notice: Subject to any disclaimer, the term of this patent is extended or adjusted under 35 U.S.C. 154(b) by 17 days.

(21) Appl. No.: 10/872,510

(22) Filed: Jun. 22, 2004

(30) Foreign Application Priority Data

Jun. 25, 2003  (FR) .................................. 03 07657

(51) Int. Cl.⁷ ............................................... F02K 3/10
(52) U.S. Cl. ...................................................... 60/762
(58) Field of Search .......................... 60/761, 762, 749

(56) References Cited

U.S. PATENT DOCUMENTS

| | | | |
|---|---|---|---|
| 3,595,024 A | 7/1971 | Kohler et al. | |
| 3,633,361 A | 1/1972 | Bauger et al. | |
| 3,747,345 A | 7/1973 | Markowski | |
| 3,826,088 A | 7/1974 | Nash et al. | |
| 4,899,539 A | 2/1990 | Gastebois et al. | |
| 4,958,489 A | * 9/1990 | Simmons | 60/226.3 |
| 5,400,589 A | 3/1995 | Mahias et al. | |
| 5,483,793 A | * 1/1996 | Weinstein et al. | 60/762 |
| 5,694,767 A | 12/1997 | Vdoviak et al. | |

* cited by examiner

Primary Examiner—Ehud Gartenberg
(74) Attorney, Agent, or Firm—Oblon, Spivak, McClelland, Maier & Neustadt, P.C.

(57) ABSTRACT

The invention relates to ventilating the confluence sheet of an afterburner chamber of an aviation turbomachine, including, upstream from the afterburner chamber: a diffuser defined by a confluence sheet disposed inside a casing, said casing and said confluence sheet defining between them an annular channel for a cold secondary flow, upstream fuel injectors being disposed at the inlet to said diffuser and flame-catchers being disposed downstream from said upstream injectors, said confluence sheet presenting, between the radial plane containing said upstream injectors and the radial plane situated at the rear ends of said flame-catchers two bends so as to flare downstream in order to slow down the primary flow F1 downstream from said upstream injectors. An annular scoop is provided around the upstream portion of said confluence sheet in order to extract a flow of air from the cold flow, said extracted flow being injected tangentially into the primary flow via a plurality of channels formed in the wall of said confluence sheet between the scoop and said diffuser.

5 Claims, 2 Drawing Sheets

VENTILATION CHANNELS IN AN AFTERBURNER CHAMBER CONFLUENCE SHEET

FIELD OF THE INVENTION

The invention relates to aviation turbomachines, in particular for military use, and that include afterburner chambers presenting an upstream diffuser.

More precisely, the invention relates to an aviation bypass turbomachine having an afterburner chamber and including, upstream from said afterburner chamber: a diffuser defined by a confluence sheet placed inside a casing, said casing and said confluence sheet defining between them an annular channel for a cold secondary flow, upstream fuel injectors being disposed at the inlet to said diffuser, and flame-catchers being disposed downstream from said injectors, the confluence sheet presenting, in the radial plane containing said injectors and the radial plane containing the flame-catchers, two bends so as to flare downstream in order to slow down the primary flow downstream from said injectors.

BACKGROUND OF THE INVENTION

That type of turbomachine including a short diffuser between the injectors and the flame-catchers is characterized by a small bypass ratio seen from the rear body. The secondary flow serves in particular to cool the parts situated downstream from the injectors and must be used effectively for this purpose.

Conversely, the primary flow coming from the low pressure turbine is flowing at a high rate. It is on this flow that the performance of the engine relies for the most part. Consequently, it must be subjected to a minimum amount of head losses and must be as uniform as possible in temperature and speed. For this purpose, the afterburner chamber diffuser constituted by the confluence sheet serves to slow down the primary flow upstream from the flame-catchers and to channel it so that, downstream, it occupies the entire volume of the afterburner chamber. This function, which is known as a "diffusion" function since it is accompanied by an increase in static pressure, needs to take place without unwanted turbulence forming along the stream, since such turbulence or backflow leads to losses that can cause the fuel coming from the upstream injectors to self-ignite.

In afterburner chambers having a large dilution ratio, the primary flow and a portion of the secondary flow meet and mix. Conversely, when the dilution ratio is small, the fraction of the secondary flow available for mixing at the downstream end of the confluence sheet is small once all of the flows needed for ventilation have been taken off. The confluence sheet therefore needs to be flared so that the primary flow occupies the full extent of the afterburner chamber. If the sheet is not properly shaped, backflow occurs in the vicinity of the confluence sheet between the plane of the injectors and the plane of the flame-catchers. This backflow is particularly encouraged when the amount of gyration at the outlet form the low pressure turbine is large.

A risk of backflow thus appears in the vicinity of a highly diffusing confluence sheet associated with a large amount of gyration in the primary flow. This backflow is predicted by numerical 3D simulation of the flow. It appears in the primary flow at the concave bend of the confluence sheet, where the sheet provides an indentation suitable for a pocket of backflow.

Furthermore, at the junction between the convex bend portion and the concave bend portion of the confluence sheet temperature and temperature gradients are excessive. Steep temperature gradients are due to the convection of the cold secondary flow which blows against the outside surface of the sheet and the hot primary flow which blows against its inside surface.

In order to eliminate turbulence, it would naturally be possible to modify the shape of the confluence sheet by lengthening the diffuser axially, but that solution increases the size of the engine.

OBJECTS AND SUMMARY OF THE INVENTION

An object of the invention is to decrease the risk of backflow and the temperature gradients without changing the shape and the length of the diffuser.

According to the invention, this object is achieved by the fact that an annular scoop is provided around the upstream portion of said confluence sheet in order to extract a flow of air from the cold flow, this extracted flow of air being injected tangentially into the primary flow via a plurality of channels formed in the wall of the confluence sheet between the scoop and said diffuser.

These channels serve firstly to cool the confluence sheet by convection, and secondly to create a film of cooling air along the confluence sheet where it is subjected to radiation from the flame in the afterburner chamber. This reduces the temperature of the structure, and also leads to a reduction in the infrared signature of the solid portions at the end of the chamber. The axial flow of cooling air along the wall of the confluence sheet also makes it possible to expel the flow disturbance from this zone.

Preferably, the channels that open out circumferentially in the wake of the injectors are of a section that is significantly greater than that of the other channels.

The greater flow of air coming from these wider channels serves to blow away the backflow.

Advantageously, the scoop is defined on the inside by a shell surrounding the upstream section of the diffuser, and on the outside by the upstream portion of a sheet which, downstream of the shell, forms the middle zone and the downstream zone of the confluence sheet that are cooled by the flow of air injected via the channels.

BRIEF DESCRIPTION OF THE DRAWINGS

Other advantages and characteristics of the invention will appear on reading the following description made by way of example and with reference to the accompanying drawings, in which.

MORE DETAILED DESCRIPTION

Figure 1:
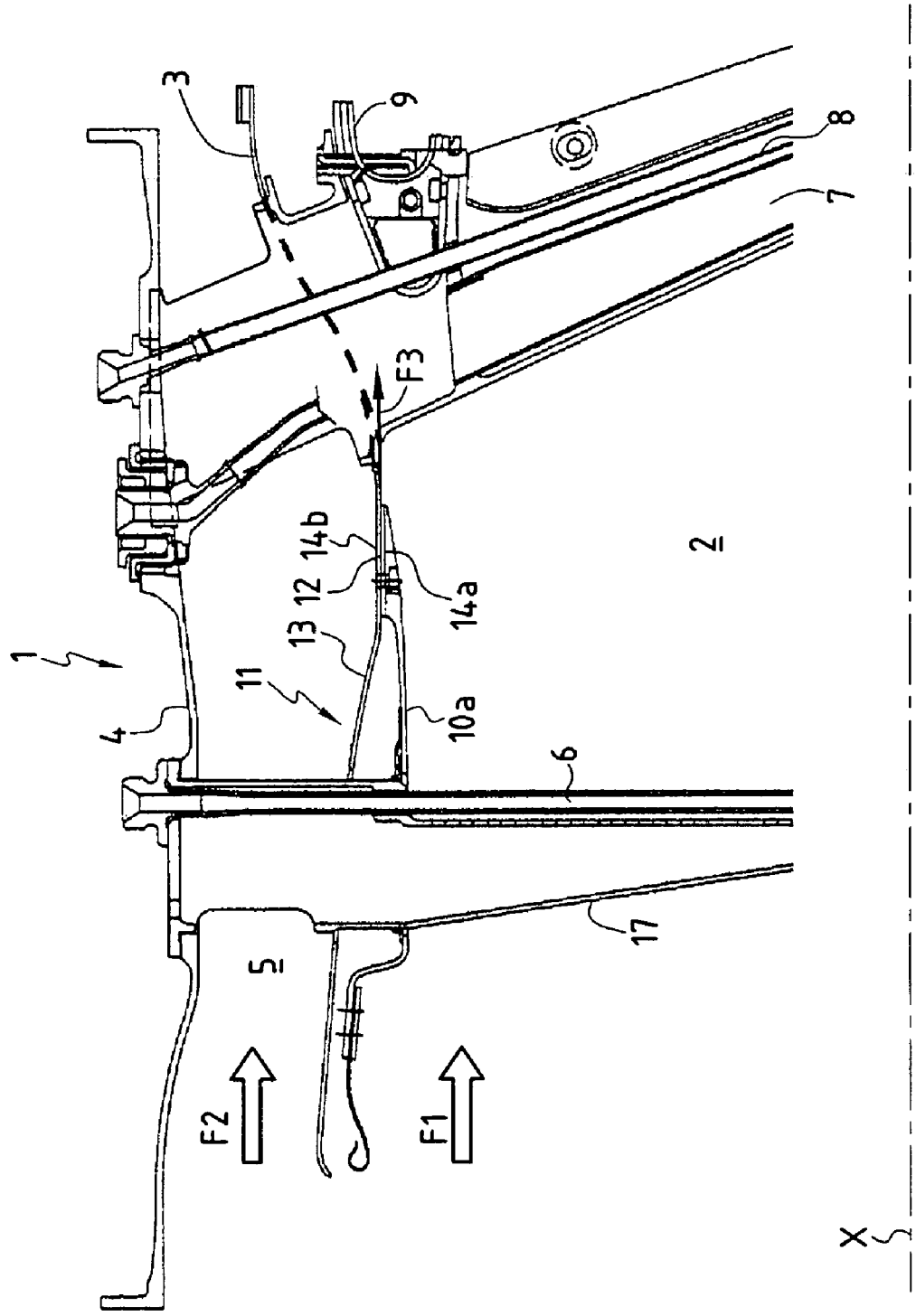
FIG. 1 is a half-section on a plane containing the axis of symmetry of the upstream portion of the rear body of an aviation turbomachine of the invention fitted with a diffuser upstream from a post-combustion chamber.

In FIG. 1, reference 1 designates the upstream portion of the rear body of an aviation turbomachine of axis X, presenting a diffuser 2 downstream from the low pressure turbine and upstream from an afterburner chamber.

The diffuser 2 is defined by a confluence sheet 3 situated radially inside a casing 4, the casing 4 and the confluence sheet 3 defining between them an annular channel 5 in which there flows a cold secondary flow F2.

At the upstream end of the diffuser 2 there are mounted radial fuel injectors 6 referred to as "upstream" injectors, which, when operating in afterburner mode, deliver a flow of fuel into the primary hot flow F1 penetrating into the diffuser 2. In a plane perpendicular to the axis X and situated upstream from the upstream injectors 6, there are radial flame-catchers 7 that are disposed in circumferential alternation with the upstream injectors 6 on meridian planes. These flame-catchers 7 are also fitted with fuel injectors 8 referred to as "downstream" injectors. Reference 9 designates an annular flame-catcher that is circularly symmetrical about the axis X and disposed at the end of the radial flame-catchers 7.

As can be seen clearly in FIG. 1, the confluence sheet 3 flares strongly in a downstream direction between the region of the upstream injectors 6 and the rear portions of the flame-catchers 7, so that the speed of the gas in the primary flow F1 is reduced at the flame-catchers 7. The confluence sheet 3 presents two bends seen from inside the diffuser 2 relative to the axis X, specifically a convex bend in the upstream region and a concave bend in the downstream region.

The object of the invention is to ensure that the confluence sheet 3 is cooled energetically in its middle zone and in its downstream zone, which zones are subjected in operation to the high temperatures that exist within the diffuser 2 and along which backflow can occur, thereby generating intense heat fluxes.

In the invention, these middle and downstream zones are cooled by a flow of air F3 taken from the secondary flow F2 by means of a scoop 11 surrounding the upstream inside extension 10a of the confluence sheet 3 in register with and downstream from the upstream injectors 6, which flow is injected tangentially to the inside face of said sheet 3 into the primary flow F1 via channels 12 formed in the wall of the confluence sheet between the inside of the scoop 11 and the diffuser 2.

Advantageously, the scoop 11 is defined on the inside by a shell 10a surrounding the upstream section of the diffuser 2, and on the outside by the upstream portion 13 of a sheet which, downstream from the shell 10a, forms the middle zone and the downstream zone of the confluence sheet 3, which zones are cooled by the flow of air F3 injected via the channels 12. This upstream portion 13 has orifices with ventilation tubes 17 passing through them with clearance to project the upstream injectors 6 so as to enable a portion of the cold secondary flow F2 to be introduced into the scoop 11. The shell 10a and the upstream portion 13 present at their downstream end axial junction zones 14a and 14b with the channels 12 being arranged at the interface between them.

Figure 2:
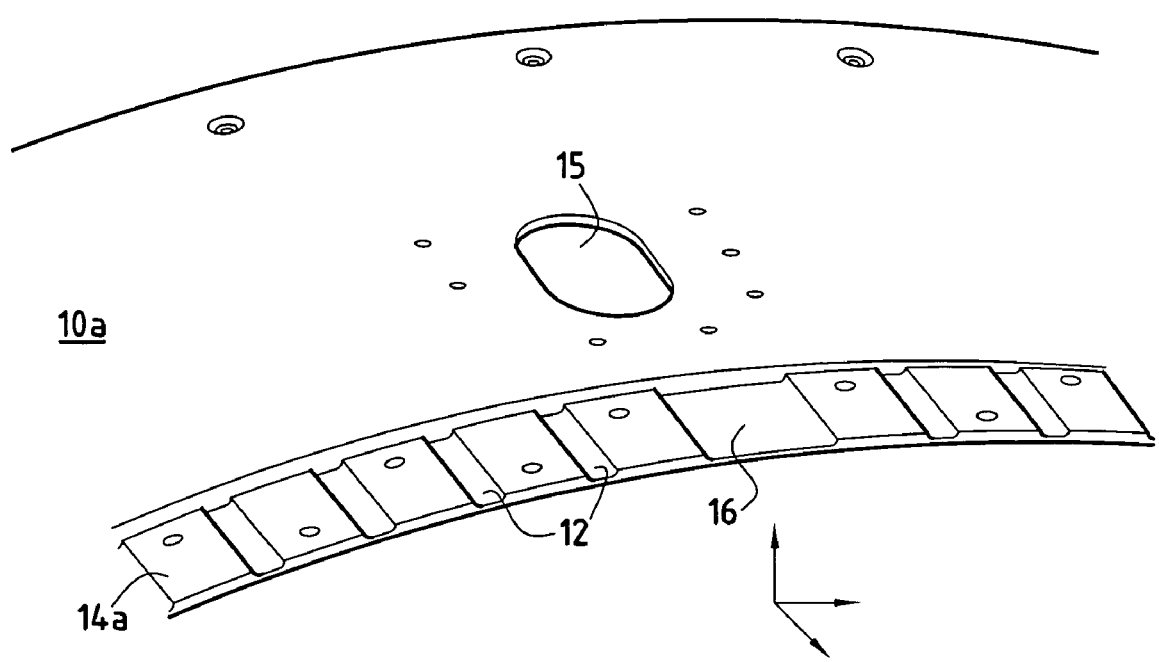
FIG. 2 is a perspective view of the inside shell defining the upstream section of the diffuser.

FIG. 2 shows the shell 10a. The channels 12 are formed in the outside face of the downstream portion 14a of the shell. Reference 15 designates an orifice through which there passes a ventilation tube 17 for an upstream injector 6.

It can be seen in this figure that the channels 12 are formed by axial grooves and that they are distributed in two groups.

In the wake of the upstream injectors 6, there are provided grooves 16 of considerable width which enable a large flow of ventilation air to be brought into the diffuser 2 so as to blow away any backflow that might start downstream from the upstream injectors 6.

Outside the wakes from the upstream injectors, the channels 12 serve essentially for cooling the walls of the confluence sheet 3 in this zone by convection and for forming a cooling film on the inside wall of said sheet 3 downstream from said zone. They are of small section.

These channels 12 and the grooves 16 are made by machining the junction zone 14a of the shell 10a prior to fixing it to the junction zone 14b of the confluence sheet 3.

The channels 12 enable the wall of the confluence sheet 3 and the shell 10 to be cooled energetically in the zones that are subjected to high temperatures.

What is claimed is:

1. An aviation turbomachine including, upstream from a afterburner chamber: a diffuser defined by a confluence sheet disposed inside a casing, said casing and said confluence sheet defining between them an annular channel for conveying a cold secondary flow, upstream fuel injectors being disposed at the inlet to said diffuser and flame-catchers being disposed downstream from said upstream injectors, said confluence sheet presenting, between the radial plane containing said upstream injectors and the radial plane situated at the rear ends of said flame-catchers, two bends so as to flare downstream in order to slow down the primary flow F1 downstream from said upstream injectors, wherein an annular scoop is provided around the upstream portion of said confluence sheet in order to extract a flow of air from the cold flow, this extracted flow of air being injected tangentially into the primary flow via a plurality of channels formed in the wall of said confluence sheet between the scoop and said diffuser.

2. A turbomachine according to claim 1, wherein the channels opening out circumferentially into the wakes from the injectors are of section that is considerably greater than the section of the other channels.

3. A turbomachine according to claim 2, wherein the scoop is defined on the inside by a shell surrounding the upstream section of the diffuser, and on the outside by the upstream portion of a sheet which, downstream from the shell forms the middle zone and the downstream zone of the confluence sheet, which zones are cooled by the flow of air injected via the channels.

4. A turbomachine according to claim 3, wherein the shell and the upstream portion present downstream junction zones, and the channels are formed at the interface of said junction zones.

5. A turbomachine according to claim 4, wherein the channels are formed in the outside face of the shell.

* * * * *